(12) United States Patent
Lee et al.

(10) Patent No.: US 12,044,337 B2
(45) Date of Patent: Jul. 23, 2024

(54) COUPLING ASSEMBLY FOR PIPE CONNECTION

(71) Applicant: New Asia Co., Ltd., Yeoju-si (KR)

(72) Inventors: Sang Heon Lee, Seoul (KR); Dong Il Han, Yeoju-si (KR)

(73) Assignee: New Asia Co., Ltd., Yeoju-si (KR)

( * ) Notice: Subject to any disclaimer, the term of this patent is extended or adjusted under 35 U.S.C. 154(b) by 78 days.

(21) Appl. No.: 17/772,116

(22) PCT Filed: Oct. 26, 2020

(86) PCT No.: PCT/KR2020/014660
§ 371 (c)(1),
(2) Date: Apr. 26, 2022

(87) PCT Pub. No.: WO2021/096101
PCT Pub. Date: May 20, 2021

(65) Prior Publication Data
US 2022/0373113 A1 Nov. 24, 2022

(30) Foreign Application Priority Data
Nov. 15, 2019 (KR) .......................... 10-2019-0146883

(51) Int. Cl.
*F16L 17/025* (2006.01)
(52) U.S. Cl.
CPC ................................. *F16L 17/025* (2013.01)
(58) Field of Classification Search
CPC ....... F16L 17/025; F16L 17/03; F16L 17/035; F16L 17/04; F16L 21/065; F16L 23/04; F16L 23/08; F16L 23/16; F16L 25/14
See application file for complete search history.

(56) References Cited

U.S. PATENT DOCUMENTS

| 3,680,894 A | 8/1972 | Young |
| 3,977,705 A | 8/1976 | Thiessen et al. |
| 2005/0253383 A1* | 11/2005 | Gibb ........................ F16L 23/08 285/112 |
| 2008/0018057 A1 | 1/2008 | Gibb et al. |
| 2010/0102549 A1 | 4/2010 | Radzik |

FOREIGN PATENT DOCUMENTS

| CN | 202215747 U | 5/2012 |
| DE | 10006029 A | 8/2001 |
| EP | 2405171 A1 | 1/2012 |

(Continued)

OTHER PUBLICATIONS

Search Report in International Application PCT/KR2020/014660 dated Jan. 29, 2021 in 14 pages.

(Continued)

*Primary Examiner* — Aaron M Dunwoody
(74) *Attorney, Agent, or Firm* — Knobbe, Martens, Olson, Bear, LLP

(57) ABSTRACT

Disclosed is a coupling assembly for pipe connection, which, even when connecting pipes having different diameters to each other, can reduce the resistance against a fluid flowing inside the pipes, can be installed in a state where couplers are temporarily assembled using fastening members, and is not deformed during the fastening process and thus can also be stably fixed after the fastening process.

11 Claims, 6 Drawing Sheets

(56) References Cited

FOREIGN PATENT DOCUMENTS

| | | |
|---|---|---|
| JP | 2007-537414 A | 12/2007 |
| JP | 2009-515101 A | 4/2009 |
| KR | 10-2007-0012723 A | 1/2007 |
| KR | 10-1980287 B1 | 6/2019 |
| KR | 10-2033757 B1 | 10/2019 |
| KR | 10-2140703 B1 | 8/2020 |

OTHER PUBLICATIONS

Office Action dated Jun. 13, 2023 in Japanese Patent Application No. 2022-528093.
Partial Supplementary European Search Repot issued in EP Application No. 20886416.5 dated Oct. 31, 2023.

* cited by examiner

COUPLING ASSEMBLY FOR PIPE CONNECTION

CROSS-REFERENCE TO RELATED APPLICATION

This application claims priority to and the benefit of Korean Patent Application No. 10-2019-0146883, filed on Nov. 15, 2019, and is a national stage application of International Application No. PCT/KR2020/014660, filed on Oct. 26, 2020, the disclosures of which are incorporated herein by reference in their entireties.

TECHNICAL FIELD

The present invention relates to a coupling assembly for pipe connection, and more specifically to a coupling assembly for pipe connection, which even when connecting pipes having different diameters to each other, can reduce the resistance against a fluid flowing inside the pipes, can be installed in a state where couplers are temporarily assembled using fastening members, and is not deformed during the fastening process and thus can also be stably fixed after the fastening process.

BACKGROUND ART

In general, pipes are connected using a coupling in order to connect pipes that are continuously arranged along the axial direction.

Such a coupling includes a plurality of segments arranged along the circumferential direction of the pipe to be interconnected, and in a state where these segments are arranged at the end of the pipe, a plurality of segments are connected to each other by using separate fastening members, thereby connecting continuous pipes.

In this case, fastening grooves are formed along the circumferential direction at both ends of the pipe, and a part of the coupling is fastened while being inserted into the fastening grooves. This is to support the pipes through a coupling such that the pipes do not open even when a force is applied in the direction where the gap between the pipes that are continuous with each other due to the pressure of the fluid inside the pipe is opened.

In addition, a sealing portion made of synthetic resin such as rubber is provided in the interior of the coupling to improve watertightness, and this sealing portion is formed with a tongue portion that limits the insertion length of the pipe such that the end of the pipe is located in the center of the coupling when the pipe is axially inserted into the interior of the coupling. As disclosed in Patent Document 1, such a tongue portion is continuously formed along the perimeter of the inner peripheral surface of the sealing portion so as to effectively support the end when the pipe is inserted.

These couplings are also used to connect pipes having different diameters from each other. That is, when connecting a pipe having a first diameter and a pipe having a second diameter which is smaller than the first diameter, the aforementioned coupling is used, and as described above, when forming a tongue portion on h inner peripheral surface of the sealing portion, in order to limit the insertion length of the pipe having the second diameter, the tongue portion needs to be formed to extend from the inner peripheral surface of the sealing portion such that the inner diameter thereof is formed to be smaller than the second diameter.

However, in this configuration, a fluid flowing inside the pipe having the second diameter receives a small resistance from the tongue portion, but a fluid flowing inside the pipe having the first diameter receives a relatively greater resistance from the tongue portion, and the fluid did not flow smoothly.

Further, in the case of a coupling, the segment is formed with an arcuate surface that is inserted into such a fastening groove, and the fastening groove is formed in a shape where a part of the outer peripheral surface of the pipe is depressed, and in this case, the segment is fastened in a state where the arcuate surface of the segment is arranged to be seated in this fastening groove. The radius of curvature of the arcuate surface is formed to be equal to the radius of the outer peripheral surface of the fastening groove such that the segment is stably fixed.

However, due to the structural feature that the outer peripheral radius of the pipe is formed to be greater than the outer peripheral radius of the fastening groove, the arcuate surface of the segment is seated into the fastening groove by moving downward in the radial direction of the pipe while placing each segment on the top of the fastening groove, and such segments are fastened to each other by using a fastening member. When arranging and fastening the segments in this way, it is difficult for an operator to work independently because the segments may need to be fastened with fastening members while maintaining the arrangement state of a plurality of segments, and work efficiency was reduced.

In order to improve this, Patent Document 1 describes a configuration which is capable of improving workability by forming the radius of curvature of the arcuate surface of the segment to be greater than the radius of the outer peripheral surface of the pipe. In other words, since the radius of curvature of the arcuate surface of the segment is formed to be greater than the radius of the outer peripheral surface of the pipe, these segments can be moved in the axial direction of the pipe in a state where these are temporarily assembled with fastening members, and through this, the temporarily assembled segments can move past the outer peripheral surface of the pipe to positions where the fastening grooves are formed.

However, as described above, since the outer peripheral radius of the fastening groove is formed to be smaller than the outer peripheral radius of the pipe, in order to seat the arcuate surface of these segments on the outer peripheral surface of the fastening groove, Patent Document 1 describes segments that can be deformed when the fastening member is tightened such that the radius of curvature of the arcuate surface coincides with the radius of the outer peripheral surface of the fastening groove.

Couplings that are applied at the constriction sites are generally formed of cast iron materials. These are produced through casting processing using cast iron, in consideration of implementing the complex shape of the couplings and the manufacturing cost at the same time.

However, when segments made of cast iron materials are fastened while these are formed in the same structure as in Patent Document 1, the segments are broken and damaged during the deformation process due to the characteristics of cast iron materials with a high carbon content, and thus, there is a limitation that these cannot be applied in the actual field.

Therefore, there may be a need to improve the foregoing.

(Patent Document 1) Korean Patent Application Laid-Open No. 10-2007-0012723 (published on Jan. 26, 2007)

SUMMARY

Technical Tasks

The present invention is to solve the problems of the related art described above. It is an object of the present invention to provide a coupling assembly for pipe connection that can reduce the resistance against a fluid flowing inside the pipes even when connecting pipes having different diameters to each other.

In addition, it is an object of the present invention to provide a coupling assembly for pipe connection that can be installed in a state where couplers are temporarily assembled using fastening members, and is not deformed during the fastening process and thus can also be stably fixed after the fastening process.

Technical Solution

A coupling assembly according to the present invention to solve the aforementioned technical problems for connecting pipes continuously arranged along the axial direction, and for connecting a first pipe having a first diameter and a second pipe having a second diameter which is smaller than the first diameter, includes two or more couplers positioned opposite to each other; and a watertight member provided inside the coupler to maintain watertightness while closely adhering to outer peripheral surfaces of the first pipe and the second pipe when the coupler is fastened, wherein the coupler is formed with engaging portions respectively inserted into fastening grooves formed on the outer peripheral surfaces of the first pipe and the second pipe, wherein the watertight member is formed with a base portion closely supported on an inner peripheral surface of the coupler, a protrusion formed to protrude from the base portion toward the end of the pipe, and a contact portion formed to extend from both ends of the base portion so as to be in close contact with the outer peripheral surface of each pipe, and wherein a plurality of the protrusions are formed on the inner peripheral surface of the base portion to be spaced apart from each other along the perimeter.

In this case, the protrusion may be provided with a reinforcing member limiting deformation of the protrusion to prevent the end of the second pipe from passing over the center of the coupler while pressing the protrusion when the second pipe is inserted.

In this case, the contact portion may include a first contact portion in close contact with the outer peripheral surface of the first pipe, and a second contact portion in close contact with the outer peripheral surface of the second pipe, and wherein the reinforcing member may be formed at a position adjacent to the second contact portion.

In this case, a close contact surface may be formed in the contact portion to be in close contact with the outer peripheral surface of the pipe, and the contact surface may include a first contact surface in close contact with the outer peripheral surface of the first pipe, and a second contact surface in close contact with the outer peripheral surface of the second pipe, and wherein the length of the first contact surface may be formed to be longer than the length of the second contact surface.

In this case, a support surface for supporting the protrusion may be formed to extend from the first contact surface to prevent the protrusion from being deformed when the second pipe is inserted in a state where the first pipe is inserted.

In this case, the diameter of the reinforcing member may be formed to be smaller than the first diameter of the first pipe.

In this case, the diameter of the reinforcing member may be formed to be greater than the second diameter of the second pipe.

In this case, the reinforcing member may be formed in a plurality to correspond to a plurality of the protrusions, and wherein the circumferential length of each of the reinforcing members may be formed to be longer than the circumferential length of the protrusion.

In this case, a fastening member for temporarily assembling a plurality of the couplers in a state where two or more of the couplers face each other may be provided in order to connect the first pipe and the second pipe, and wherein interference preventing grooves may be formed on both sides of the engaging portion to prevent interference between the engaging portion and the pipe such that the outer peripheral surface of the pipe is capable of penetrating between the couplers that are temporarily assembled.

In this case, an arch surface opposite to the outer peripheral surface of the fastening groove is formed in the engaging portion, and a first extension surface formed to extend radially outward from the arch surface is formed in the interference preventing groove.

In this case, a second extension surface formed to extend downward from the first extension surface and having a curvature disposed concentrically with the arch surface is formed in the interference preventing groove.

In this case, an auxiliary support surface for supporting the side surface of the watertight member may be formed in the interference preventing groove to prevent the side surface of the watertight member from protruding to the outside through the interference preventing groove when water pressure is applied to the inside of the coupler.

In this case, the auxiliary support surface has a surface in a closed curved shape in which a connection surface connecting any one position on the first extension surface and another position on the second extension surface, the first extension surface and the second extension surface are formed.

In this case, a position where the arch surface and the first extension surface abut may be formed in a range of greater than 0° and 24° or less with respect to the bottom surface of the coupler.

In this case, a position where the arch surface and the first extension surface abut may be formed in a range of 12° or more and 20° or less with respect to the bottom surface of the coupler.

Effects

According to the coupling assembly for pipe connection of the present invention having the above configuration, since the protrusion formed on the watertight member is divided into a plurality of parts, it is possible to minimize the resistance against a fluid flowing inside the pipes, and thus, there is an advantage that the fluid flow is smooth.

In addition, since it is possible to install two or more couplers on pipes in a state where these are temporarily assembled by fastening members, there is an advantage of improving workability.

In addition, since the couplers are configured to be seated in the fastening grooves formed on the pipes even if the couplers are not deformed during the fastening process of the couplers, stable fixation is possible after fastening, and there is an advantage of sufficiently satisfying the water pressure required for field application.

BRIEF DESCRIPTION OF THE DRAWINGS

FIGS. 3A and 3B are views illustrating the watertight member according to an embodiment of the present invention, in which FIG. 3A is an overall perspective view, and FIG. 3B is a partial perspective view.

DETAILED DESCRIPTION OF EMBODIMENTS

Figure 1:
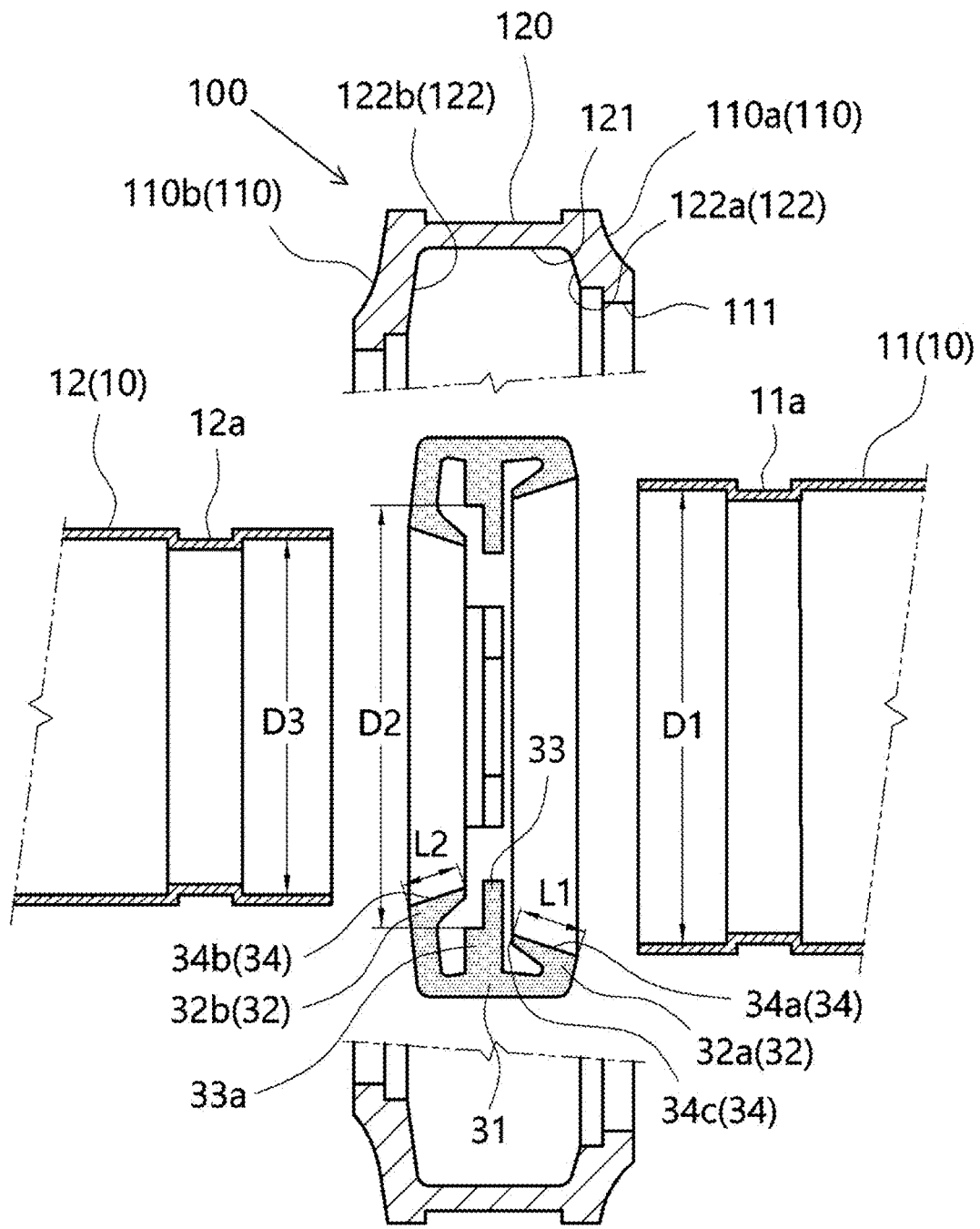
FIG. 1 is a cross-sectional view illustrating a state before the coupling assembly according to an embodiment of the present invention is fastened.

Hereinafter, embodiments of the present invention will be described in detail with reference to the accompanying drawings such that those of ordinary skill in the art to which the present invention pertains may easily practice the present invention. The present invention may be implemented in various different forms, and is not limited to the embodiments described herein. In the drawings, parts irrelevant to the description are omitted in order to clearly describe the present invention, and the same reference numerals are assigned to the same or similar components throughout the specification.

In the present specification, terms such as "include", "have" or the like are intended to designate that a feature, a number, a step, an operation, a component, a part or a combination thereof described in the specification exists, and these should be understood such that it does not preclude the possibility of the presence or addition of one or more other features or numbers, steps, operations, components, parts or combinations thereof.

Figure 2:
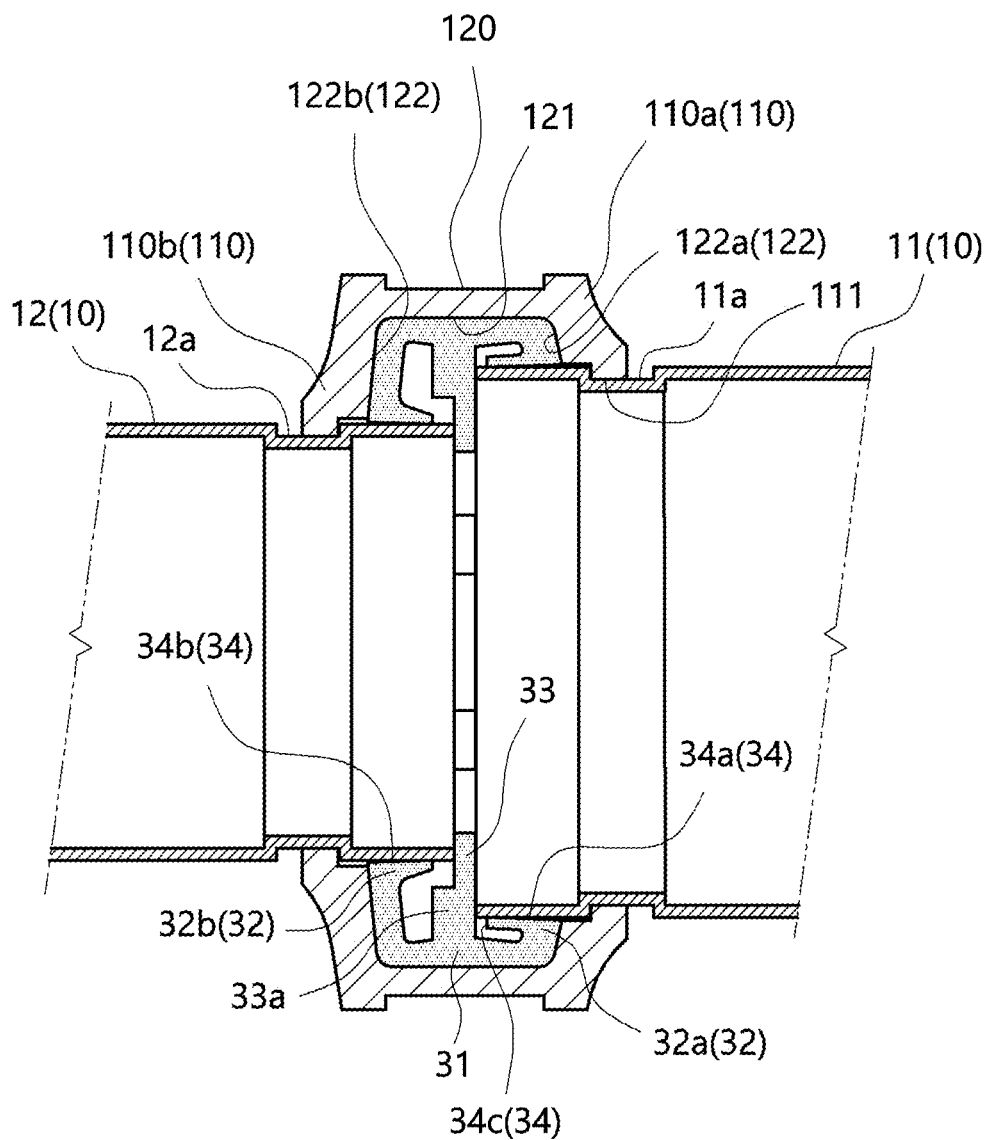
FIG. 2 is a cross-sectional view illustrating a state where the coupling assembly according to an embodiment of the present invention is fastened.
Figures 3A, 3B:
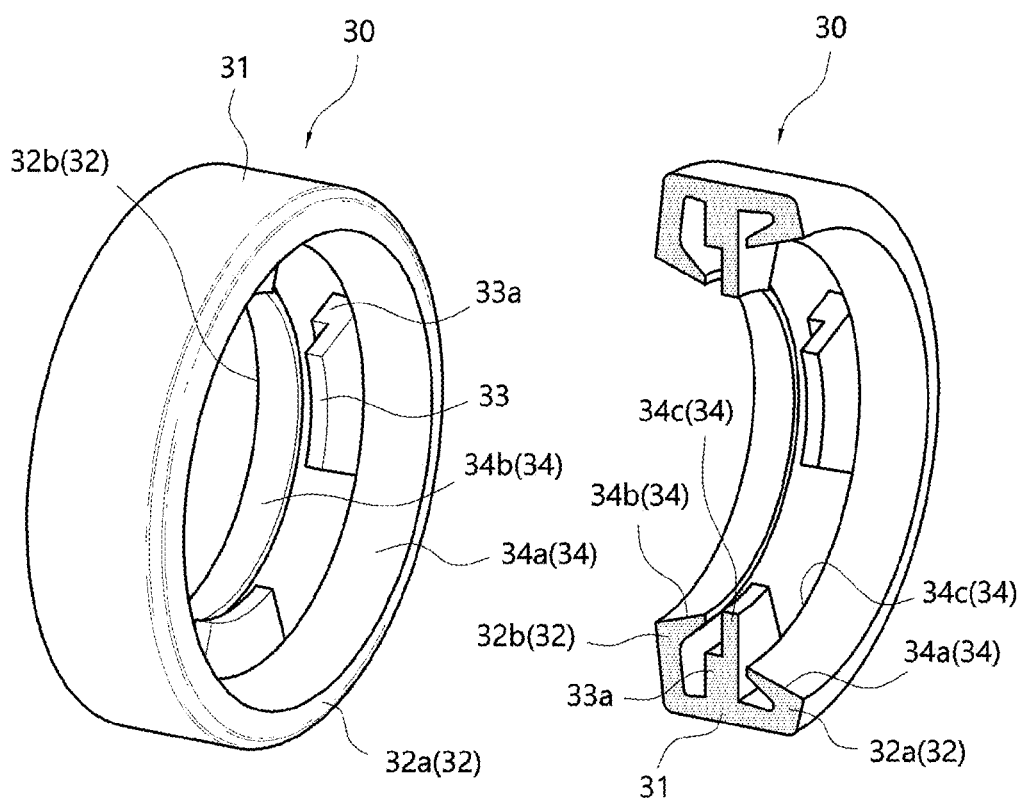
Figure 4:
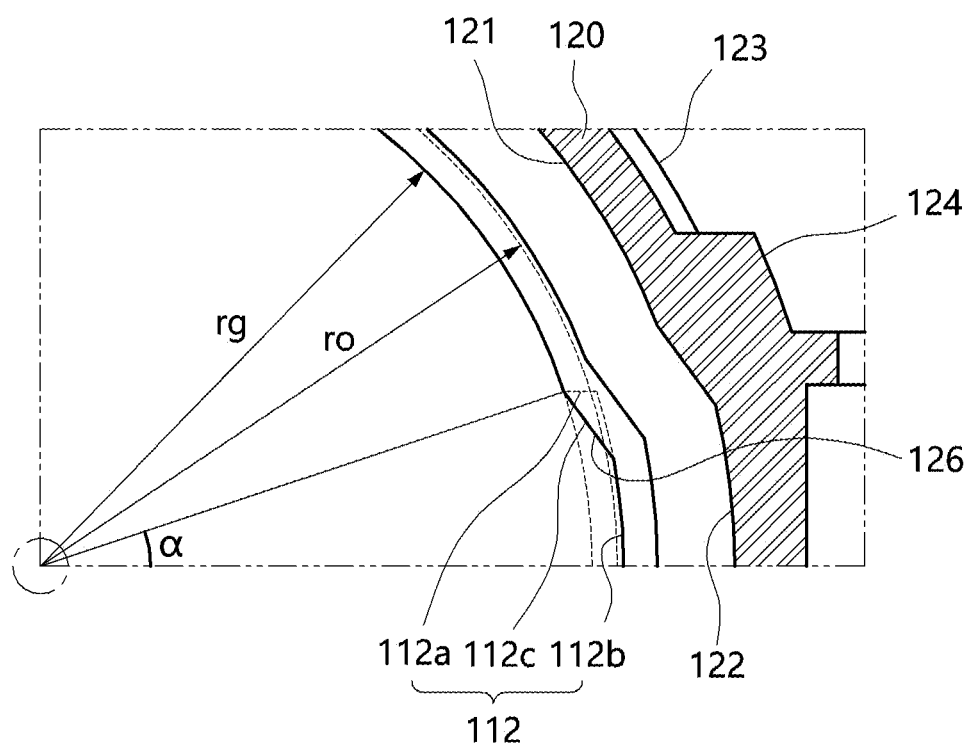
FIG. 4 is an enlarged cross-sectional view illustrating the interference preventing groove of the coupling assembly according to an embodiment of the present invention.
Figure 5:
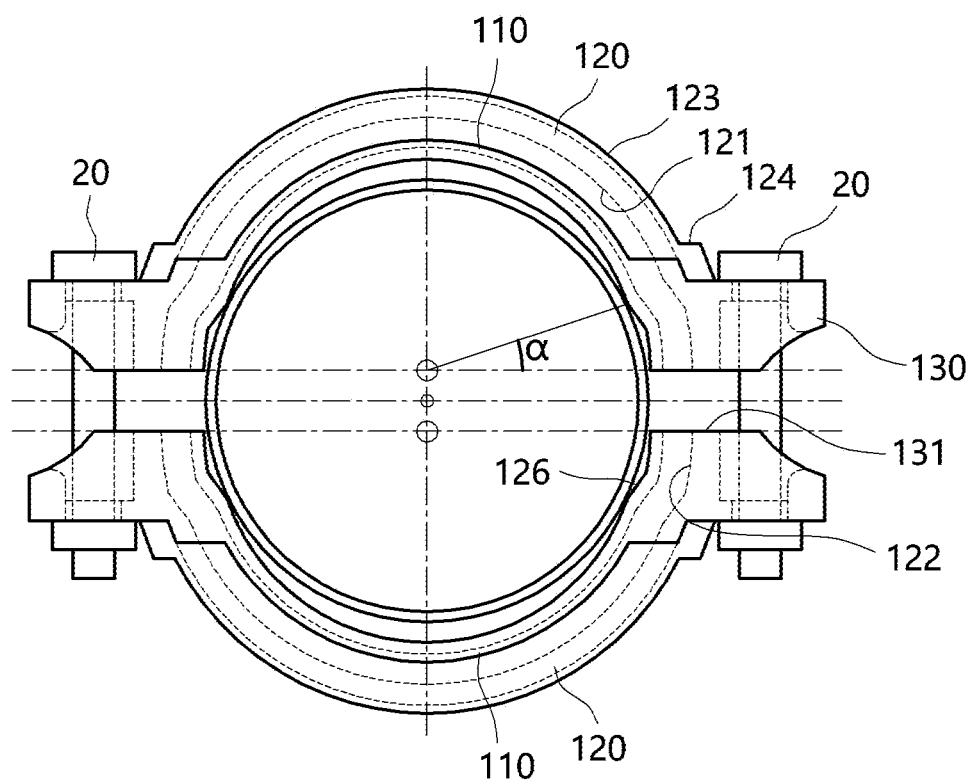
FIG. 5 is a front view illustrating a state before the coupling assembly according to an embodiment of the present invention is fastened.
Figure 6:
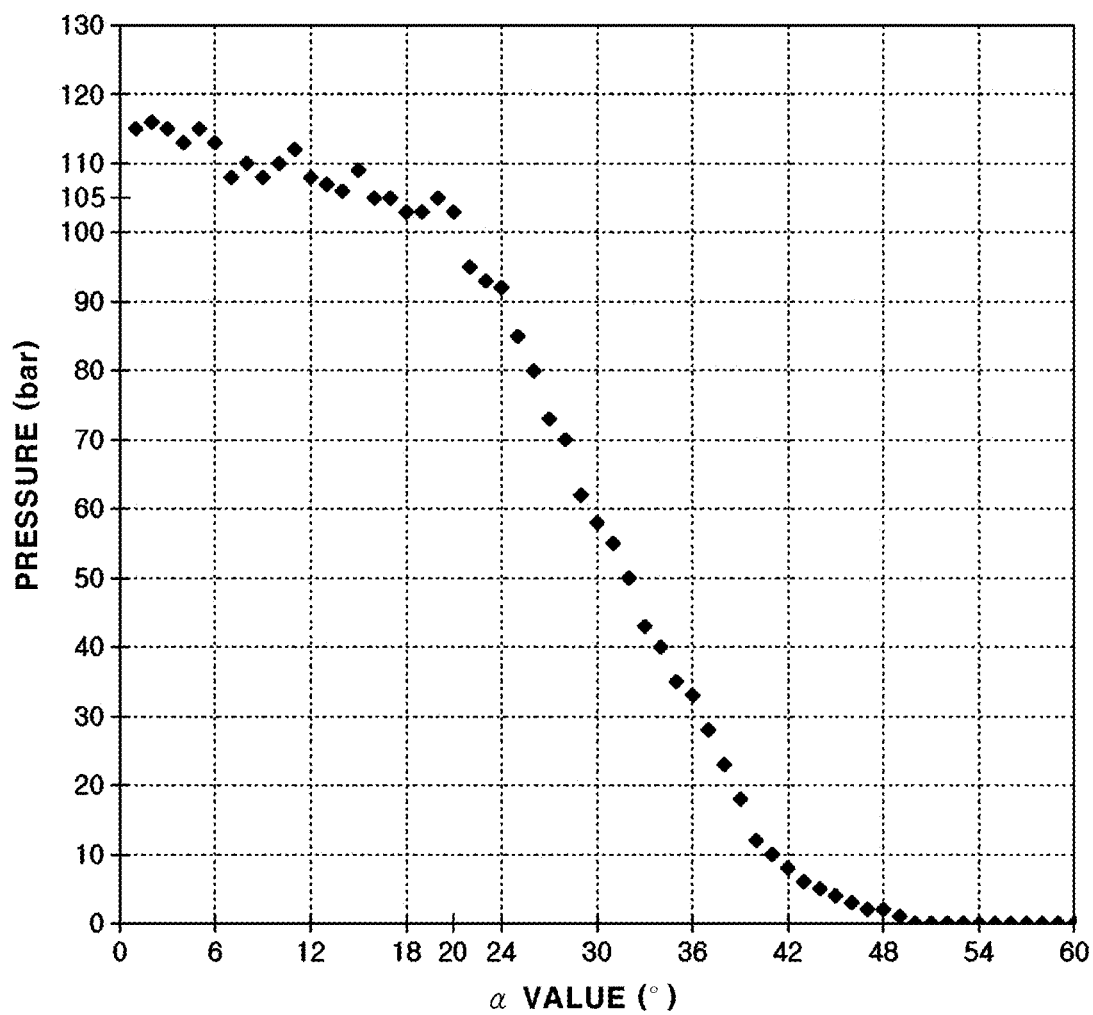
FIG. 6 is a performance graph illustrating the correlation of the allowable water pressure according to the formation position of the first extension surface of the coupling assembly according to the present invention.

FIG. 1 is a cross-sectional view illustrating a state before the coupling assembly according to an embodiment of the present invention is fastened, FIG. 2 is a cross-sectional view illustrating a state where the coupling assembly according to an embodiment of the present invention is fastened, FIGS. 3A and 3B are views illustrating the watertight member according to an embodiment of the present invention, in which FIG. 3A is an overall perspective view, and FIG. 3B is a partial perspective view, FIG. 4 is an enlarged cross-sectional view illustrating the interference preventing groove of the coupling assembly according to an embodiment of the present invention, FIG. 5 is a front view illustrating a state before the coupling assembly according to an embodiment of the present invention is fastened, and FIG. 6 is a performance graph illustrating the correlation of the allowable water pressure according to the formation position of the first extension surface of the coupling assembly according to the present invention.

As illustrated in FIG. 1, the coupling assembly according to the present invention connects pipes 10 that are continuously arranged along the axial direction, and it is a coupling assembly for connecting a first pipe 11 having a first diameter D1 and a second pipe 12 having a second diameter D3 which is smaller than the diameter D1.

Such a coupling assembly includes two or more couplers 100 positioned opposite to each other, and a watertight member 30 provided inside the coupler 100 to maintain watertightness while closely adhering to outer peripheral surfaces of the first pipe 11 and the second pipe 12 when the coupler 100 is fastened, wherein the coupler 100 is formed with engaging portions 110 respectively inserted into fastening grooves 11a, 12a formed on the outer peripheral surfaces of the first pipe 11 and the second pipe 12, wherein the watertight member 30 is formed with a base portion 31 closely supported on an inner peripheral surface of the coupler 100, a protrusion 33 formed to protrude from the base portion 31 toward the end of the pipe 10, and a contact portion 32 formed to extend from both ends of the base portion 31 so as to be in close contact with the outer peripheral surface of each pipe 10, and wherein a plurality of protrusions 33 are formed on the inner peripheral surface of the base portion 31 to be spaced apart from each other along the perimeter.

In this case, as illustrated in FIG. 1, the coupler 100 may be provided with a body portion 120 in which the engaging portion 110 is formed to be extended, and the body portion 120 may be formed with a rear support surface 121 supporting the rear of the watertight member 30, and a lateral support surface 122 supporting the side of the watertight member 30, and the lateral support surface 122 may include a first lateral support surface 122a formed on the side of the first pipe 11, and a second lateral support surface 122b formed on the side of the second pipe 12.

As described above, when forming the protrusion 33 on the inner peripheral surface of the watertight member 30, in order to limit the insertion length of the second pipe 12 having a second diameter D3, the protrusion 33 may be needed to be formed to extend from the inner peripheral surface of the watertight member 30 such that the inner diameter thereof is formed to be smaller than the second diameter D3.

However, in this configuration, a fluid flowing inside the second pipe 12 having a second diameter D3 receives a small resistance from the protrusion 33, but since a fluid flowing inside the first pipe 11 having a first diameter D1 receives a relatively greater resistance from these protrusions 33, the fluid may not flow smoothly, and thus, a plurality of protrusions 33 are configured to be spaced apart from each other along the perimeter of the inner peripheral surface of the base portion 31.

When the protrusions 33 are divided and formed into a plurality of portions as described above, the resistance received by the fluid flowing inside the pipe 10 decreases, thereby making the fluid flow smooth.

In this case, as illustrated in FIG. 1, when the second pipe 12 is inserted, in order to prevent the end of the second pipe 12 from passing over the center of the coupler while pressing the protrusion 33, the protrusion 33 may be provided with a reinforcing member 33a for limiting deformation of the protrusion 33.

That is, the protrusion 33 is formed to extend radially inward from the inner peripheral surface of the base portion 31, and the radial extension length of the protrusion 33 has to be formed to be long enough to support the end of the second pipe 12 having a smaller diameter than the first pipe 11. In this case, when the reinforcing member 33a is provided that limits deformation of the protrusion 33 when the second pipe 12 is inserted, the second pipe 12 is effectively supported such that the end of the second pipe 12 may be configured to be placed in the center of the coupler 100.

In this case, as illustrated in FIG. 1, the contact portion 32 may include a first contact portion 32a that is in close contact with the outer peripheral surface of the first pipe 11, and a second contact portion 32b that is in close contact with the outer peripheral surface of the second pipe 12, and the aforementioned reinforcing member 33a may be formed at a position adjacent to the second contact portion 32b.

In the case of the second contact portion 32b, since it is formed to be relatively longer radially inward than the first contact portion 32a such that it adheres to the outer peripheral surface of the second pipe 12 having a small diameter, a relatively wider separation space is formed between the base portion 31 and the second contact portion 32b than between the base portion 31 and the first contact portion 32a, and the reinforcing member 33a is formed in this separation space. In this way, when the reinforcing member 33a is formed in the separation space between the base portion 31 and the second contact portion 32b, as illustrated in FIG. 2, even if the second pipe 12 is inserted, the second contact portion 32b and the reinforcing member 33a may be prevented from causing mutual interference.

In addition, when the reinforcing member 33a is formed on the side of the second contact portion 32b, in a situation where the end of the second pipe 12 presses the protrusion 33 according to the insertion of the second pipe 12 and passes over the center of the coupler 100, it is possible to effectively support the end of the second pipe 12 because the reinforcing member 33a limits the deformation of the protrusion 33 in such a way that pulls the protrusion 33.

In this case, the contact portion 32 is formed with a contact surface 34 in close contact with the outer peripheral surface of the pipe 10, and such a contact surface 34 includes a first contact surface 34a in close contact with the outer peripheral surface of the first pipe 11, and a second contact surface 34b in close contact with the outer peripheral surface of the second pipe 12. In addition, the length L1 of the first contact surface 34a may be formed to be longer than the length L2 of the second contact surface 34b, and if the second contact surface 34b is formed to be longer than the first contact surface 34a in this way, it is possible to secure stable watertightness.

Furthermore, if the length of the aforementioned first contact surface 34a is formed to be sufficiently long, the first contact portion 32a supports the side surface of the protrusion 33 while the first pipe 11 is inserted, and thus, when the second pipe 12 is inserted, the protrusion 33 may be prevented from being deformed while being pushed by the end of the second pipe 12. To this end, the first contact portion 32a may be provided with a support surface 34c which is formed to extend from the first contact surface 34a.

In this case, as illustrated in FIG. 2, the diameter D2 of the aforementioned reinforcing member 33a may be formed to be smaller than the first diameter D1 of the first pipe 11. That is, in this configuration, since the inner peripheral surface of the reinforcing member 33a is provided radially inside compared to the inner peripheral surface of the first pipe 11 such that the reinforcing member 33a effectively supports the protrusion 33 when the first pipe 11 is inserted, it is possible to prevent the first pipe 11 from passing over the center of the coupler 100.

In addition, as illustrated in FIG. 2, the diameter D2 of the aforementioned reinforcing member 33a is formed to be greater than the second diameter D3 of the second pipe 12 so as to be spaced apart from the second pipe 12. That is, when configured in this way, the inner peripheral surface of the second pipe 12 is provided radially inside compared to the inner peripheral surface of the reinforcing member 33a such that when the second pipe 12 is inserted, it is possible to effectively prevent the interference of the reinforcing member 33a with the second pipe 12 from occurring.

In this case, as illustrated in FIGS. 3A and 3B, the reinforcing member 33a is formed in a plurality so as to correspond to a plurality of protrusions 33, and the length in the circumferential direction of each reinforcing member 33a may be formed to be longer than the length in the circumferential direction of the protrusion 33.

That is, as described above, since the diameter D2 of the reinforcing member 33a is formed to be greater than the second diameter D3 of the second pipe 12, it is irrelevant to the flow of the fluid flowing inside the second pipe 12. In this state, if the length in the circumferential direction of the reinforcing member 33a is longer than the length in the circumferential direction of the protrusion 33, the reinforcing member 33a may support the protrusion 33 more effectively.

In this case, in order to connect the first pipe 11 and the second pipe 12, a fastening member 20 for temporarily assembling a plurality of couplers 100 is provided while two or more couplers 100 are disposed opposite to each other, and interference preventing grooves 112 for preventing interference between the engaging portion 110 and the pipe 10 may be formed on both sides of the engaging portion 110 such that the outer peripheral surface of the pipe 10 may be penetrated through the temporarily assembled coupler 100.

That is, in order to connect the pipes 10 that are continuously arranged along the axial direction, two or more couplers 100 are disposed opposite to each other, and while the fastening member 20 is temporarily assembled to a plurality of couplers 100, it is configured to be able to connect the pipes 10.

In this case, the coupler 100 is formed with engaging portions 110 inserted into the fastening grooves 11a, 12a formed in each of the pipes 10, and the inner diameters of the engaging portions 110 are formed in sizes corresponding to the outer diameters of the fastening grooves 11a, 12a.

That is, when the distance from the center of the pipe 10 to the outer peripheral surface of the pipe 10 is ro and the distance from the center of the pipe 10 to the outer peripheral surfaces of the fastening grooves 11a and 12a is rg, the inner diameters of the engaging portions 110 are formed in sizes corresponding to the outer diameters of the fastening grooves 11a, 12a such that the engaging portions 110 may be in close contact with the outer peripheral surfaces of the fastening grooves 11a, 12a. In this case, the inner diameters of the engaging portions 110 may be formed to be slightly greater than the outer diameters of the fastening grooves 11a, 12a. This is because the engaging portion 110 is in close contact from the outer side in the radial direction than the fastening grooves 11a, 12a. The difference in size between the inner diameters of the engaging portions 110 and the outer diameters of the fastening grooves 11a, 12a may be formed only to the extent that the engaging portions 110 may be in close contact with the outer peripheral surfaces of the fastening grooves 11a, 12a.

When configured in this way, it is possible to secure structural stability by the engaging portions 110 being in close contact with the outer peripheral surfaces 11a of the fastening grooves 11a and 12a.

However, when the engaging portions 110 are configured to be in close contact with the outer peripheral surfaces 11a of the fastening grooves 11a, 12a, it is possible to secure structural stability, but when a plurality of couplers 100 are inserted into the outer peripheral surface 10a of the pipe along the axial direction while being temporarily assembled by the fastening member 20, a problem may occur therefrom where a plurality of temporarily assembled couplers 100 may not be inserted while the engaging portion 110 is caught on the outer peripheral surface 10a of the pipe 10.

Therefore, as illustrated in FIGS. 4 and 5, interference preventing grooves 112 are formed on both sides of the engaging portion 110. These interference preventing grooves 112 are formed with a gap between the temporary assembly couplers 100 such that the outer peripheral surface of the pipe 10 may pass through.

That is, the engaging portions 110 are in close contact with the outer peripheral surfaces of the fastening grooves 11a, 12a, thereby ensuring structural stability, and as the interference preventing grooves 112 are formed on both sides of the engaging portion 110, since the coupler 100 may be installed while passing through the pipe 10 in the axial direction in a temporarily assembled state, it is possible to improve workability.

As described above, such a coupler 100 is formed with a first engaging portion 110a inserted into the fastening groove 11a formed in the first pipe 11, and a second engaging portion 110b inserted into the fastening groove 12a formed in the second pipe 12, and a body portion 120 connecting the first engaging portion 110a and the second engaging portion 110b is formed. In addition, a watertight member 30 having elasticity is provided inside the space formed through the body portion 120 and the engaging portion 110 so as to prevent leakage of a fluid flowing through the pipe 10.

In addition, as illustrated in FIG. 5, the coupler 100 is formed with a fastening portion 130 through which the fastening member 20 passes, and the fastening portion 130 formed on the coupler 100 facing each other passes through the fastening member at the same time and then is fastened. In this way, when the coupler 100 is placed in the correct position, before fastening by using the fastening member 20, the operator moves the couplers 100 disposed opposite to each other in parallel in the radial direction of the pipe 10, and checks whether the couplers 100 are normally fastened in such a way that the bottom surfaces 131 formed on the fastening portions 131 come into contact with each other. In this case, the couplers 100 are formed such that the bottom surfaces 131 formed on the fastening portions 130 may contact each other even without a separate deformation.

When the continuously arranged pipes 10 and the temporarily assembled couplers 100 are installed in the correct position, the fastening force is applied using the fastening member 20 thereafter. When the fastening force is applied in this way, the couplers 100 disposed opposite to each other move in parallel in the radial direction of the pipe 10, and when the fastening portions 130 formed in the couplers 100 come into contact with each other, the couplers 100 do not move anymore, and a certain level of fastening torque is applied to the fastening member 20 in this state. In this case, since the inner diameters of the engaging portions 110 are formed to be slightly greater than the outer diameters of the fastening grooves 11a, 12a such that the engaging portions 110 may be in close contact with the outer peripheral surfaces 11a of the fastening grooves 11a, 12a, deformation does not occur in the couplers 100 in the process of abutting the fastening portion 130 formed on the coupler 100.

Moreover, as described above, when the coupler 100 moves in parallel in the radial direction of the pipe 10, the engaging portions 110 formed in the coupler 100 are inserted into the fastening grooves 11a, 12a, and then the pipe 10 is supported such that it does not open in the axial direction by the internal fluid pressure.

In this case, as illustrated in FIGS. 1 and 2, an arch surface 111 opposite to the outer peripheral surface of the fastening groove 11a, 12a may be formed in the engaging portion 110, and as illustrated in FIG. 4, a first extension surface 112a formed to extend radially outward from the arch surface 111 may be formed in the aforementioned interference preventing groove 112.

That is, since the first extension surface 112a extends radially outward from the arch surface 111, it is easy to secure a gap between the engaging portion 110 and the outer peripheral surface 10a of the pipe 10.

In addition, a second extension surface 112b formed to extend downward from the first extension surface 112a and having a curvature disposed concentrically with the arch surface 111 may be formed in the interference preventing groove 112.

That is, while the first extension surface 112a is formed to extend outward in the radial direction, the second extension surface 112b is further formed to be extended from the first extension surface 112a, and the gap between the engaging portion 110 and the outer peripheral surface 10a of the pipe 10 is secured as much as a portion where the first extension surface 112a and the second extension surface 112b are formed.

In this case, as illustrated in FIG. 4, the second extension surface 112b is formed to have a curvature disposed concentrically with the arch surface 111. In this way, when the second extension surface 112b is formed to have a curvature disposed concentrically with the arch surface 111, the second extension surface 112b may be disposed concentrically on the outer peripheral surface 11a of the fastening grooves 11a, 12a formed on the pipe 10 and the outer peripheral surface 10a of the pipe 10, and when the second extension surface 112b is located more radially outside than the outer peripheral surface 10a of the pipe 10, the operator may easily check visually whether the engaging portions 110 are stably adhered to the outer peripheral surfaces 11a of the fastening grooves 11a, 12a through the arrangement state of the outer peripheral surface 10a and the second extension surface 112b of the pipe 10.

Moreover, the first extension surface 112a may be formed to have a length such that the second extension surface 112b may be positioned radially outward compared to the outer peripheral surface 10a of the pipe 10.

In this case, as illustrated in FIG. 4, in order to prevent the contact portion 32 of the aforementioned watertight member 30 from protruding to the outside through the interference preventing groove 112 when water pressure is applied to the inside of the coupler 100 to the interference preventing groove 112, an auxiliary support surface 126 for supporting the contact portion 32 may be formed.

That is, when a pressure of 100 bar or more is applied to the inside of the coupler 100, the contact portion 32 of the watertight member 30 may be damaged while protruding to the outside through the interference preventing groove 1121 formed by the first extension surface 112a and the second extension surface 112b, but as described above, when an auxiliary support surface 126 for supporting the contact portion 32 of the watertight member 30 is formed in the interference preventing groove 112, it prevents the contact portion 32 from protruding such that the watertight member 30 is not damaged, and it is possible to stably prevent fluid leakage.

Such an auxiliary support surface 126 may be configured to have a surface in a closed curved shape in which a connection surface 112c connecting any one position on the first extension surface 112a and another position on the second extension surface 112b, the first extension surface 112a and the second extension surface 112b are formed.

That is, since the aforementioned auxiliary support surface 126 has a closed curved cross-section formed of the connection surface 112c, the first extension surface 112a and the second extension surface 112b, the auxiliary support surface 126 supports the contact portion 32 when water pressure is applied, and thus, it is possible to effectively prevent the watertight member 30 from protruding to the outside through the interference preventing groove 112.

Such a connection surface 112c connects any one position on the first extension surface 112a and another position on the second extension surface 112b, and in other words, as illustrated in FIG. 4, starting from one end of the first extension surface 112a, it may be configured to connect any one position on the second extension surface 112b.

In particular, when the connection surface 112c connects any one position on the second extension surface 112b, and connects the position between one end of the second extension surface 112b and the other end of the second extension surface 112b, as illustrated in FIG. 4, a second extension surface 112b is formed following the connection surface 112c. If configured in this way, as described above, through the arrangement state of the outer peripheral surface 10a and the second extension surface 112b of the pipe, the operator may easily check visually whether the engaging portions 110 are stably in close contact with the outer peripheral surfaces 11a of the fastening grooves 11a, 12a.

Alternatively, it may be configured to connect from one end of the first extension surface 112a to the other end of the second extension surface 112b, or starting at any one position on the first extension surface 112a, it is also possible to be configured to connect to the other end of the second extension surface 112b. When the auxiliary support surface 126 is formed in this way, a certain area of the interference preventing groove 112 is closed to support the contact portion 32 of the watertight member 30.

Moreover, the auxiliary support surface 126 may be formed to extend radially outward with respect to the connection surface 112c such that interference with the outer peripheral surface of the pipe 10 does not occur when the pipe 10 is fastened after the coupler 100 is temporarily assembled.

In this case, in a portion where the first extension surface 112a is formed, the arch surfaces 111 of the engaging portions 110 and the outer peripheral surfaces 11a of the fastening grooves 11a and 12a are spaced apart from each other, and thus, it is not possible for the engaging portions 110 to support the pipe 10 in this portion. This means that the water pressure that the coupler 100 may support decreases due to the formation of the first extension surface 112a. Therefore, the first extension surface 112a may be formed within a range capable of satisfying the allowable water pressure after the coupler 100 is fastened. Since the formation position of the first extension surface 112a not only determines whether the coupler 100 may be easily inserted into the pipe 10 in the axial direction when the coupler 100 is installed in the pipe 10 in a temporary assembly state, but also when a force is applied in the direction where the gap between the pipes 10 that are continuous with each other by the pressure of the inner fluid of the pipe 10 is opened, it determines whether it may effectively support the first extension surface 112a, and thus, it is necessary to carefully determine the formation position of the first extension surface 112a.

When the formation position of the first extension surface 112a, that is, the angle formed to the position where the arch surface 111 and the first extension surface 112a abut with respect to the bottom surface 131 of the coupler 100 is defined as a, as illustrated in FIG. 6, it can be confirmed that the allowable water pressure increases as the first extension surface 112a is formed at a lower angle. In other words, the formation position of the first extension surface 112a and the allowable water pressure are in inverse proportion to each other.

In addition, as the formation angle of the first extension surface 112a increases, the allowable water pressure decreases, and when this angle exceeds 24°, the allowable water pressure rapidly decreases, and thus, this angle may be formed to be less than 24°.

In addition, generally, as representative standards related to the coupler 100 for connecting the pipe 10, there are the Underwriters Laboratories (UL) standards in the United States, and according to these UL standards, in the case of the coupler 100 for connecting the pipes 10, it is stipulated that it may need to withstand a water pressure equivalent to 5 times the water pressure used.

In other words, since the water pressure used in buildings is generally about 21 bar, it needs to withstand a water pressure of at least 105 bar in accordance with the UL standards.

Accordingly, when checking the allowable water pressure of the coupler 100 while changing the formation angle of the first extension surface 112a, as illustrated in FIG. 6, since the allowable water pressure of the coupler 100 does not satisfy the UL standards of the United States when the formation angle of the first extension surface 112a is more than 20°, the first extension surface 112a may be formed at a position where a is 20° or less.

In this case, the allowable water pressure increases as the first extension surface 112a is formed at a lower angle, but as the first extension surface 112a is formed at a lower angle, it becomes difficult to install the couplers 100 on the pipes 10 in a temporarily assembled state. Accordingly, the first extension surface 112a needs to be formed at a minimum position that may be installed in the pipe 10 or at least a position higher than this position while the coupler 100 is temporarily assembled.

The process for deriving the minimum value of a is as follows.

First, when the coupler 100 is moved downward from the upper part of the outer peripheral surface 10a of the pipe 10, the radius of curvature of the arch surface 111 of the engaging portion 110 is formed to be smaller than the radius of curvature (ro) of the outer peripheral surface of the pipe 10, and as a result, the engaging portion 110 may not move downward while covering only a portion of the outer peripheral surface 10a of the pipe 10, and the height of the coupler 100 is fixed at this position.

That is, while the height of the coupler 100 is fixed in this way, the other part of the pipe 10 located vertically below both ends of the coupler 100 has a greater radius of curvature (ro) of the outer peripheral surface 10a of the pipe 10, and thus, it means a part that may not be inserted into the coupler 100.

Therefore, there is a need to form an interference preventing groove 112 such that other portions of the pipe 10 that may not be inserted into the coupler 100 may be inserted into the coupler 100 as described above, and the angle formed by a line extending from the center of the pipe 10 to one end of the coupler 100 having a fixed height and a horizontal line passing through the center of the pipe 10 becomes the minimum value of a, and the minimum value of a derived through this process is 12°.

In the end, the formation angle of a may be formed in a range of 12° to 20°.

As described above, a watertight member 30 for preventing fluid leakage is provided between the pipe 10 and the coupler 100, and inside the coupler 100, a rear support surface 121 for supporting and fixing the base portion 31 of the watertight member 30, and a lateral support surface 122 for supporting and fixing the contact portion 32 of the watertight member 30 are formed That is, when the coupler 100 is assembled using the fastening member 20 while the watertight member 30 is disposed between the pipe 10 and the coupler 100, the watertight member 30 is pressed by the coupler 100 to press the outer circumferential surface 10a of the pipe 10. As the watertight member 30 is pressed in this way, fluid leakage is prevented, and if the watertight member 30 is elastically deformed while being properly pressed in accordance with the design specifications, the leakage of fluid is effectively prevented, but if the watertight member 30 is deformed due to a pressing force exceeding the design specifications in the process of being pressed, due to such excessive deformation, the fluid leaks from a portion where the watertight member 30 and the pipe 10 contact each other.

Therefore, when the watertight member 30 is deformed due to a pressing force that exceeds the design specifications in the process of being pressed by the coupler 100, even if this watertight member 30 is pressed by the coupler 100, a deformation allowing groove 125 is formed which is formed to extend radially outward from both ends of the rear support surface 121 so as not to press the outer peripheral surface of the pipe 10 anymore.

That is, when the watertight member 30 is applied with a pressing force that meets the design specifications, the watertight member 30 is elastically deformed and presses the outer peripheral surface of the pipe 10. However, if a pressing force exceeding the design specifications is applied to the watertight member 30, the watertight member 30 is configured not to pressurize the outer peripheral surface of the pipe 10 anymore, while deforming radially outward along the deformation allowing groove 125, thereby solving the problem of fluid leakage due to the excessive deformation of the watertight member 30.

Further, in the process of assembling the coupler 100, frictional force acts between the rear support surface 121 and the outer peripheral surface of the watertight member 30, and particularly, as a large frictional force acts on the rear support surface 121 formed adjacent to both ends of the coupler 100 among the rear support surfaces 121, the watertight member 30 is pressurized while being pushed along the assembly direction of the coupler 100 by this frictional force, and excessive deformation of the watertight member 30 occurs. Although this may cause fluid leakage, as described above, when the deformation allowing groove 125 which is formed to extend radially outward from both ends of the rear support surface 121 is formed, both ends of the rear support surface 121 are spaced apart from the outer circumferential surface of the watertight member 30, and thus, it is possible to solve the problem of excessive deformation of the watertight member 30 due to frictional force.

In this case, as illustrated in FIGS. 4 and 5, reinforcing portions 124 which are formed to extend radially outward at both ends of the outer peripheral surface 123 of the body portion 120 of the coupler 100 may be formed.

As described above, when the deformation allowing groove 125 which is formed to extend radially outward from the rear support surface 121 is formed, a problem may occur in durability due to a decrease in the thickness of the body portion 120 of the coupler 100, and in order to prevent this, a reinforcing portion 124 is formed to extend radially outward on the outer peripheral surface 123 of the body portion 120 of the coupler 100.

Although an embodiment of the present invention has been described above, the spirit of the present invention is not limited to the embodiment presented in the present specification, and those skilled in the art who understand the spirit of the present invention will be able to easily suggest other embodiments by modifying, changing, deleting or adding components within the scope of the same spirit, but this is also said to be within the scope of the present invention.

What is claimed is:

1. A coupling assembly for connecting pipes continuously arranged along an axial direction, and for connecting a first pipe having a first diameter and a second pipe having a second diameter which is smaller than the first diameter, the coupling assembly comprising:
   two or more couplers positioned opposite to each other; and
   a watertight member provided inside the couplers to maintain watertightness while closely adhering to an outer peripheral surface of the first pipe and an outer peripheral surface of the second pipe when the couplers are fastened,
   wherein each coupler is formed with engaging portions respectively inserted into fastening grooves formed on the outer peripheral surfaces of the first pipe and the second pipe,
   wherein the watertight member is formed with a base portion closely supported on an inner peripheral surface of each coupler, a plurality of protrusions formed to protrude from the base portion toward an end of the first pipe and an end of the second pipe, and a first contact portion and a second contact portion formed to extend from both ends of the base portion,
   wherein the plurality of protrusions are formed on an inner surface of the base portion to be spaced apart from each other along a circumferential direction,
   wherein each protrusion is provided with a reinforcing member limiting deformation of the protrusion to prevent the end of the second pipe from passing over a center of the coupler while pressing the protrusion when the second pipe is inserted,
   wherein the first contact portion is in close contact with the outer peripheral surface of the first pipe, and the second contact portion is in close contact with the outer peripheral surface of the second pipe,
   wherein the reinforcing member is formed in a separation space formed between the base portion and the second contact portion so as to be formed at a position adjacent to the second contact portion,
   wherein an inner diameter of the reinforcing member is formed to be smaller than the first diameter of the first pipe and greater than the second diameter of the second pipe so as to be spaced apart from the second pipe in a state that the couplers are fastened such that the coupling assembly is assembled with the first pipe and the second pipe.

2. The coupling assembly of claim 1, wherein a contact surface is formed in the contact portion to be in close contact with the outer peripheral surface of the pipe, and the contact surface comprises a first contact surface in close contact with the outer peripheral surface of the first pipe, and a second contact surface in close contact with the outer peripheral surface of the second pipe, and
 wherein a length of the first contact surface is longer than a length of the second contact surface.

3. The coupling assembly of claim 2, wherein a support surface for supporting the protrusion is formed to extend from the first contact surface to prevent the protrusion from being deformed when the second pipe is inserted in a state where the first pipe is inserted.

4. The coupling assembly of claim 1, wherein the reinforcing member is formed in plural to correspond to the plurality of protrusions, and
 wherein a circumferential length of each of the reinforcing members is longer than a circumferential length of the protrusion.

5. The coupling assembly of claim 1, wherein a fastening member for temporarily assembling a plurality of the couplers in a state where two or more of the couplers face each other is provided in order to connect the first pipe and the second pipe, and
 wherein interference preventing grooves are formed on both sides of the engaging portion to prevent interference between the engaging portion and the pipe such that the outer peripheral surface of the pipe is capable of penetrating between the couplers that are temporarily assembled.

6. The coupling assembly of claim 5, wherein an arch surface opposite to an outer peripheral surface of the fastening groove is formed in the engaging portion, and
 wherein a first extension surface formed to extend radially outward from the arch surface is formed in the interference preventing groove.

7. The coupling assembly of claim 6, wherein a second extension surface formed to extend downward from the first extension surface and having a curvature disposed concentrically with the arch surface is formed in the interference preventing groove.

8. The coupling assembly of claim 7, wherein an auxiliary support surface for supporting a side surface of the watertight member is formed in the interference preventing groove to prevent the side surface of the watertight member from protruding to an outside through the interference preventing groove when a water pressure is applied to an inside of the coupler.

9. The coupling assembly of claim 8, wherein the auxiliary support surface has a surface in a closed curved shape in which a connection surface connecting any one position on the first extension surface and another position on the second extension surface, the first extension surface and the second extension surface are formed.

10. The coupling assembly of claim 6, wherein a position where the arch surface and the first extension surface abut is formed in a range of greater than 0° and 24° or less with respect to a bottom surface of the coupler.

11. The coupling assembly of claim 10, wherein a position where the arch surface and the first extension surface abut is formed in a range of 12° or more and 20° or less with respect to a bottom surface of the coupler.

* * * * *